(12) United States Patent
Spintzyk

(10) Patent No.: US 7,399,245 B2
(45) Date of Patent: Jul. 15, 2008

(54) OVERLOAD PROTECTION DEVICE

(76) Inventor: Eugen Spintzyk, Birkenstr. 55, Kirchberg/Jagst D-74592 (DE)

(*) Notice: Subject to any disclaimer, the term of this patent is extended or adjusted under 35 U.S.C. 154(b) by 104 days.

(21) Appl. No.: 11/326,360

(22) Filed: Jan. 5, 2006

(65) Prior Publication Data

US 2007/0021250 A1     Jan. 25, 2007

(30) Foreign Application Priority Data

Jul. 6, 2005     (DE)    .................... 20 2005 010 791 U

(51) Int. Cl.
*F16H 3/00* (2006.01)
*B65H 3/00* (2006.01)

(52) U.S. Cl. .......................... 474/94; 271/116; 271/125
(58) Field of Classification Search ................. 474/195, 474/94; 271/116, 122, 124, 125; 464/64, 464/160, 161, 180
See application file for complete search history.

(56) References Cited

U.S. PATENT DOCUMENTS

| | | | |
|---|---|---|---|
| 3,610,063 A * | 10/1971 | Hart | ............................ 474/94 |
| 3,988,891 A | 11/1976 | Hoyler | |
| 4,355,989 A | 10/1982 | Szendró et al. | |
| 5,601,002 A * | 2/1997 | Lucienne | .................... 464/68.5 |
| 5,908,095 A * | 6/1999 | Jackel et al. | ............. 192/70.17 |
| 6,109,227 A * | 8/2000 | Mott | ........................ 123/90.31 |
| 6,131,487 A * | 10/2000 | Jackel et al. | ................ 464/64.1 |
| 6,547,227 B1 * | 4/2003 | Mende | ........................ 267/168 |

FOREIGN PATENT DOCUMENTS

FR              609.501           1/1926

* cited by examiner

*Primary Examiner*—Richard W L Ridley
*Assistant Examiner*—James Pilkington
(74) *Attorney, Agent, or Firm*—Frank H. Foster; Kremblas, Foster, Phillips & Pollick

(57) ABSTRACT

An overload protection device (1) with a primary section (4) for the coupling of the overload protection device (1) with a drive device (2) and with a secondary section (6) for coupling of the overload protection device (1) with an operating section (7). The primary section (4) and the secondary section (6) can be turned around a rotation axis (8), with respect to one another, around a rotation angle phi. A spring element (5), which is interposed between the primary section (4) and the secondary section (6) is formed in such a way that the spring element (5) counteracts a rotation of the primary and secondary sections (4, 6). The invention is characterized by a spring element (5) that extends concentrically around the rotation axis (8) in an angular range of at least 180°.

5 Claims, 3 Drawing Sheets

OVERLOAD PROTECTION DEVICE

Figure 1:
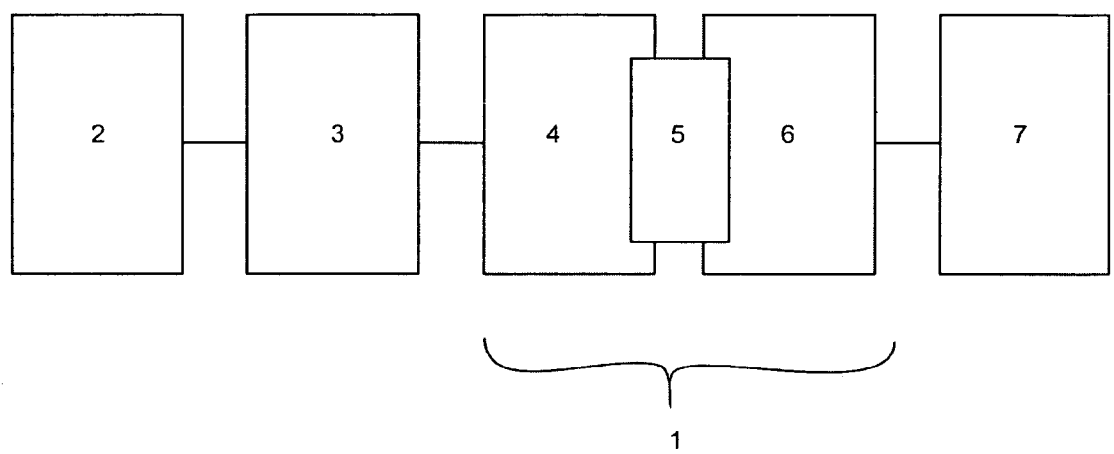

The invention concerns an overload protection device with a primary section for coupling the overload protection device with a drive device, with a secondary section for the coupling of the overload protection device with an operating device, wherein the primary section and the secondary section can be turned around a rotating axis, against one another, with a rotating angle phi, and with a spring element, which is interposed between the primary section and the secondary section and is designed in such a way that the spring element counteracts a rotation of primary and secondary sections.

There are a large number of operating machines that have the characteristic or the tendency to suddenly lock from continuous operation. A known problem hereby is that the kinetic energy ($E_{rot}=\frac{1}{2}\cdot J d \cdot \omega^2$) stored in the rotating masses of the operating machine strongly loads the drive elements during the locking. In particular, short locking times can suddenly release high energy peaks and lead to a peak load of the drive elements. A similar problem is also present with operating machines in which load peaks appear during the operation.

For the reduction of the loads of the drive elements, locking protection devices or torque-limiting elements are known, which are interposed between the drive device and operating device and operate according to the principle of a screen, friction, or viscous coupling. Such devices slip upon attaining a certain torque or are actively uncoupled, for example, by an electrohydraulic regulating mechanism, so that the power transmission between the drive device and the operating device is briefly interrupted and the operating device runs more or less free.

These known devices have a large number of disadvantages. With the friction coupling, an unclean response behavior may be present because of the differences between static friction and sliding friction. Furthermore, the wear and the limited thermal capacity are problematic. In friction or screen coupling, the sliding moments or rest moments lie above the breakdown torque, so as to avoid a constant decoupling and thus a premature wear of the device. These breakdown torques, however, can lead to a high load on the drive device. The electrohydraulically regulated couplings can have a slow response behavior as a result of regulation-technically caused idle times. Moreover, they have a complex structure because of the high sensor and regulation technology expenditure and thus are also susceptible to defects.

From publication FR 609.501, a coupling with a primary part and a secondary part is known, wherein the primary part and the secondary part are coupled with one another via several short springs, so that symmetrical energy from transmission shocks can be taken up in both rotation devices.

Publication U.S. Pat. No. 4,355,989 shows a force transfer device for an agricultural cutting machine, which superimposes an oscillatory movement in the form of oscillations on the main operating movement of the cutting machine. A cam with spokes, which is coupled via springs with a primary part, which is designed as a outer ring arranged concentrically with respect to the cam, is provided as a secondary part in the force transfer device. The amplitudes of the oscillations should take up values between 3 and 3.5 mm on the periphery of the cutting drum of the cutting machines.

The goal of the invention is to improve the locking function in an overload protection device.

This goal is attained with a device in accordance with claim 1. Optional invention developments can be deduced from the dependent claims and the subsequent description.

The overload protection device, in accordance with the invention, can be used advantageously with shredders, mills, chain conveyors, hackers, chaff-cutters, crushers, bucket excavators or also can be advantageously used in starting operations with the aid of slip-ring rotor motors. Generally speaking, the overload protection device of the invention can be used for devices that possess the characteristic or tendency to be suddenly locked out from continuous operation or to have high load peaks in continuous operation.

Provision is made so that the device in accordance with the invention can be coupled between the drive device—that is, for example, a motor—and the operating device—that is, for example, an operating device operated with the drive device. In this respect, the device has a primary section, which can be coupled directly or indirectly with the drive device and a secondary section, which can be coupled directly or indirectly with the operating device. The primary section and secondary section are designed in their construction in such a way and arranged with respect to one another that they can be rotated against one another, around a preferably common rotation axis. Preferably, the rotating axis is, at the same time, the rotation axis, around which the load protection device turns during a force transfer from the drive device to the operating device. A spring element is provided between the primary section and the secondary section, and is designed in its construction and arranged in such a way that its spring force counteracts a rotating movement by the primary and secondary sections.

In accordance with the invention, provision is made so that the spring element essentially extends concentrically around the rotating axis—over an angle area of at least 180°. The spring element is therefore arranged like a reference circle, wherein the center of the reference circle is on the rotating axis. The spring force of the spring element is tangentially oriented with respect to the reference circle. This embodiment, in accordance with the invention, has the advantage that the spring element has an extraordinarily great buffer capacity to absorb the kinetic energy stored in the rotating masses of the operating machine and thus forms a kind of shock absorber in a locking process.

In a preferred embodiment of the invention, provision is made so that the primary section and the secondary section have a carrier element, on which the spring element is supported on one end or is suspended on one end.

Preferably, it is precisely a spring element that is provided. Alternately, provision can be made so that several spring elements are provided; these are connected parallel to one another, however. In both embodiments, the spring element or elements can counteract a rotating movement of the primary section and secondary section only in one rotation direction.

In a preferred embodiment, primary and secondary sections jointly form an annular slot or an annular channel in which the spring element and/or the carrier elements are located so that they can move. By this embodiment, the spring element and/or carrier elements are protected from soiling. Moreover, potential impairment hazards are reduced by an encapsuled structure of the overload protection device.

Advantageously, the spring element extends over a range of up to 360°, in particular in a range of 340-355°. The spring element, therefore, extends almost over a full circle, wherein a closed angular range, which is covered by the carrier elements, is left free from the full circle. The left-free angular range is therefore determined by the product- and usage-related strength of the carrier elements, which are preferably in contact to one another in a nonloaded position at rest.

Alternately, the spring element can extend like a spiral around the rotation axis and thus have several windings. In this way, it is possible to use particularly long spring elements and to increase once again the buffer capacity. With all embodiments, the spring element is, for example, constructed as a coil spring or a folded leaf spring. Generally, however, all types of pressure or tension springs can be used as the spring element.

Preferably, the overload protection device is coupled with its primary section, in particular, via a step-down gear with a drive device and with a secondary section with an operating device. In particular, the overload protection device is designed, in its construction, in such a way that rotations, especially multiple rotations or continuous rotations can be transferred or are transferred through and by means of the overload protection device.

Figure 2:
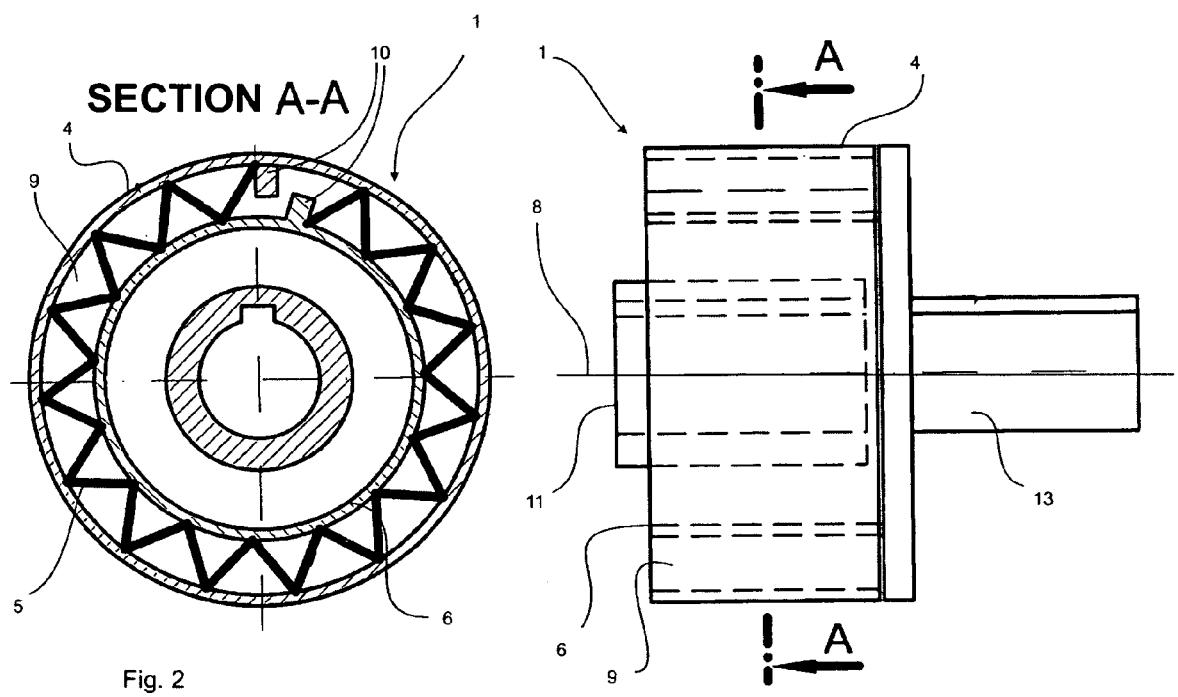
Figure 3:
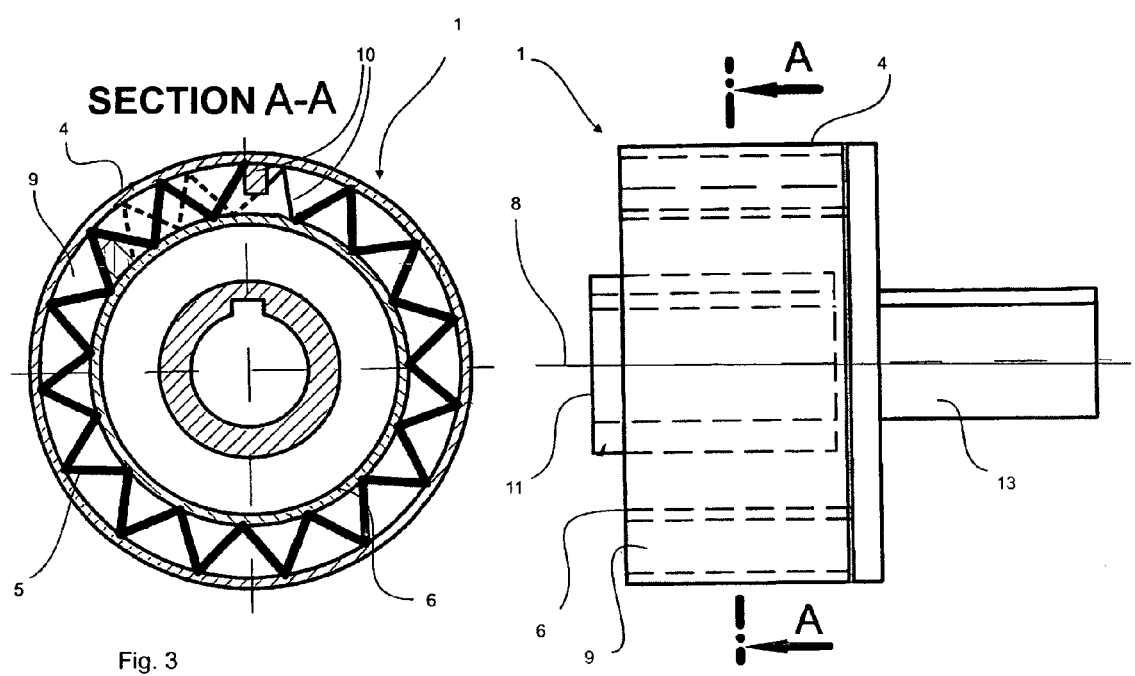

Other details, features, feature combinations, advantages and effects on the basis of the invention can be deduced from the subsequent description of preferred embodiment examples of the invention and from the drawings. The figures show the following, in schematic representation:

FIG. 1, a block sketch of a machine with the overload protection device;

FIG. 2, a first embodiment example of an overload protection device, which can be used in a machine according to FIG. 1;

FIG. 3, a second embodiment example of an overload device, which can be used in a machine according to FIG. 1.

The same or corresponding parts are shown in the figures with the same reference numbers.

FIG. 1 shows a block sketch of a machine with an overload protection device 1. The machine comprises any drive device 2, which is coupled via a step-down gear 3 with the overload protection device 1, which is coupled, at the same time, with an operating device 7. The overload protection device 1 has a primary section 4, a secondary section 6, and a spring element 5, which connects the primary section 4 and the secondary section 6 with one another in a rotation-elastic manner. For a possible embodiment of the overload protection device 1, reference is made to the description of FIGS. 2 and 3.

A rotation movement, produced by the drive device 2, is transferred via the step-down gear 3 to a driven shaft, which is not depicted in FIG. 1, so that it begins to rotate. The driven shaft is connected, stiff against torsion, with the primary section 4 of the overload protection device 1, so that in a normal undisturbed continuous operation, the entire overload protection device I also starts rotating. This rotation movement is transferred to an operating device 7, via another shaft not depicted in FIG. 1, which is connected, stiff against torsion, with the secondary section 6 of the overload protection device 1.

With a sudden locking or with a load peak of the operating device 7, the elastic spring element 5, interposed between the primary section 4 and the secondary section 6, permits a rotation of the two sections 4 and 6 with respect to one another in such a way that the kinetic energy stored in the operating device 7 is at least partially stored in the spring element 5. This intermediate storage of energy makes it possible for the step-down gear 3 or the driven device 2 not to be exposed to any abrupt braking device.

FIG. 2 shows a first embodiment example of an overload protection device 1, on the right side in a schematic side view and on the left side in schematic cross-section representation along the section line A-A.

The overload protection device 1 has a tubular primary section 4 and a likewise tubular secondary section 6, which is situated concentrically with respect to a common rotating axis 8 and to the primary section 4 and is embraced by it, so that an annular slot 9 is formed between the primary section 4 and the secondary section 6.

A carrier element 10 is situated on the outside of the secondary section 6 facing the annular slot 9, and on the inside of the primary section 4 facing the annular slot 9; each carrier element projects into the annular slot 9. A pressure spring 5 is also provided in the annular slot 9; it is supported, on the end sides, on the carrier elements 10, runs concentrically with respect to the common rotation axis 8, and extends approximately over an angular range of 350° around the common rotation axis 8.

The primary section 4 is connected, stiff against torsion, with a holder 11 for a gear driven shaft, wherein the holder 11 is constructed as a part of a shaft-cam connection; it is situated coaxially with respect to the common rotating axis 8. The holder 11 is covered, at least in sections, by the primary section 4 and the secondary section 6. The secondary section 6 is connected, stiff against torsion, with a shaft 13 via a cover element 12, wherein the shaft 13 is situated coaxially with respect to the common rotation axis 8.

During operation, the complete overload protection device 1 rotates around the common rotation axis 8, in the representation of FIG. 2, left side, in a counterclockwise direction. If there is a locking or a load peak of an operating device coupled with the secondary section 6, then the secondary 6 is also locked or slowed down. The limiting torque M is $M = F_{spring\ characteristic} * radius$, wherein "$F_{spring\ characteristic}$" is the compressive force of the spring as a function of the spring characteristic and "radius," the distance between rotating axis 8 and pressure spring 5. The spring characteristic is so coordinated that in the case of a locking, the pressure spring 5 is shortened by a specific rotation angle above a limiting torque.

As a reaction on the locking, a relative rotation between the primary section 4 and secondary section 6 occurs, so that the pressure spring 5 is compressed and absorbs at least a part of the kinetic energy of the rotating masses of the operating device 7.

FIG. 3 shows a second embodiment of the overload protection device 1, wherein in contrast to the embodiment in FIG. 2, the pressure spring 5 extends over an angle area of ca. 380° around the common rotation axis 8. This is made possible in that the pressure spring 5 is situated in a helical form in the annular slot 9 and the carrier elements 10 are arranged staggered in the extension direction of the common rotation axis 8. The windings of the pressure spring 5 are shown overlapping in the cross section representation, on the left side of FIG. 3.

The advantages of the invention are, above all, to be found in that the overload protection device exhibits a clear, determined response behavior on the basis of the spring characteristic and barely any wear; it is constructed simply, clearly, and robustly; and no thermal problems are produced; and by a suitable selection of the spring characteristic, the limiting torque can also be limited below the motor breakdown torque.

REFERENCE SYMBOL LIST

1 Overload protection device
2 Drive device
3 Step-down gear
4 Primary section
5 Spring element, pressure spring
6 Secondary section
7 Operating device
8 Rotational axis
9 Annular slot
10 Carrier element
11 Holder
12 Cover element
13 Shaft

The invention claimed is:

1. An overload protection device (1) with a primary section (4) for the coupling of the overload protection device (1) with a drive device (2), with a secondary section (6) for the coupling of the overload protection device (1) with an operating section (7), wherein the primary section (4) and the secondary section (6) can be turned around a rotation axis (8), with respect to one another, around a rotation angle phi, and with a spring element (5), which is interposed between the primary section (4) and the secondary section (6) and is formed in such a way that the spring element (5) counteracts a rotation of primary and secondary sections (4, 6), characterized in that
   (a) the primary section (4) and the secondary section (6) each has a carrier element (10) that is situated in an annular slot (9) formed concentrically with respect to the rotation axis (8) between the primary section (4) and the secondary section (6) so the carrier elements can be moved; and
   (b) the spring element (5) consists of one and only one compression coil spring formed in the shape of a helix that extends completely between the carrier elements (10) and extends concentrically around the rotation axis (8) in an angular range of at least 180°.

2. An overload protection device (1) according to claim 1, characterized in that the spring element (5) extends over an angular range of 340°-355°.

3. An overload protection device (1) according to claim 1, characterized in that the carrier elements (10) are arranged staggered in the direction of the rotation axis (8) and the coil spring element (5) extends in a helical path around the rotation axis (8) and covers an angular range of 360° up to 1080° and is situated essentially concentrically around the rotation axis (8).

4. An overload protection device (1) according to claim 3, characterized in that the secondary section (6) is coupled with an operating device (7).

5. An overload protection device (1) according to claim 3, characterized in that multiple rotations or endless rotations can be transferred via an overload protection device (1).

* * * * *